UNITED STATES PATENT OFFICE.

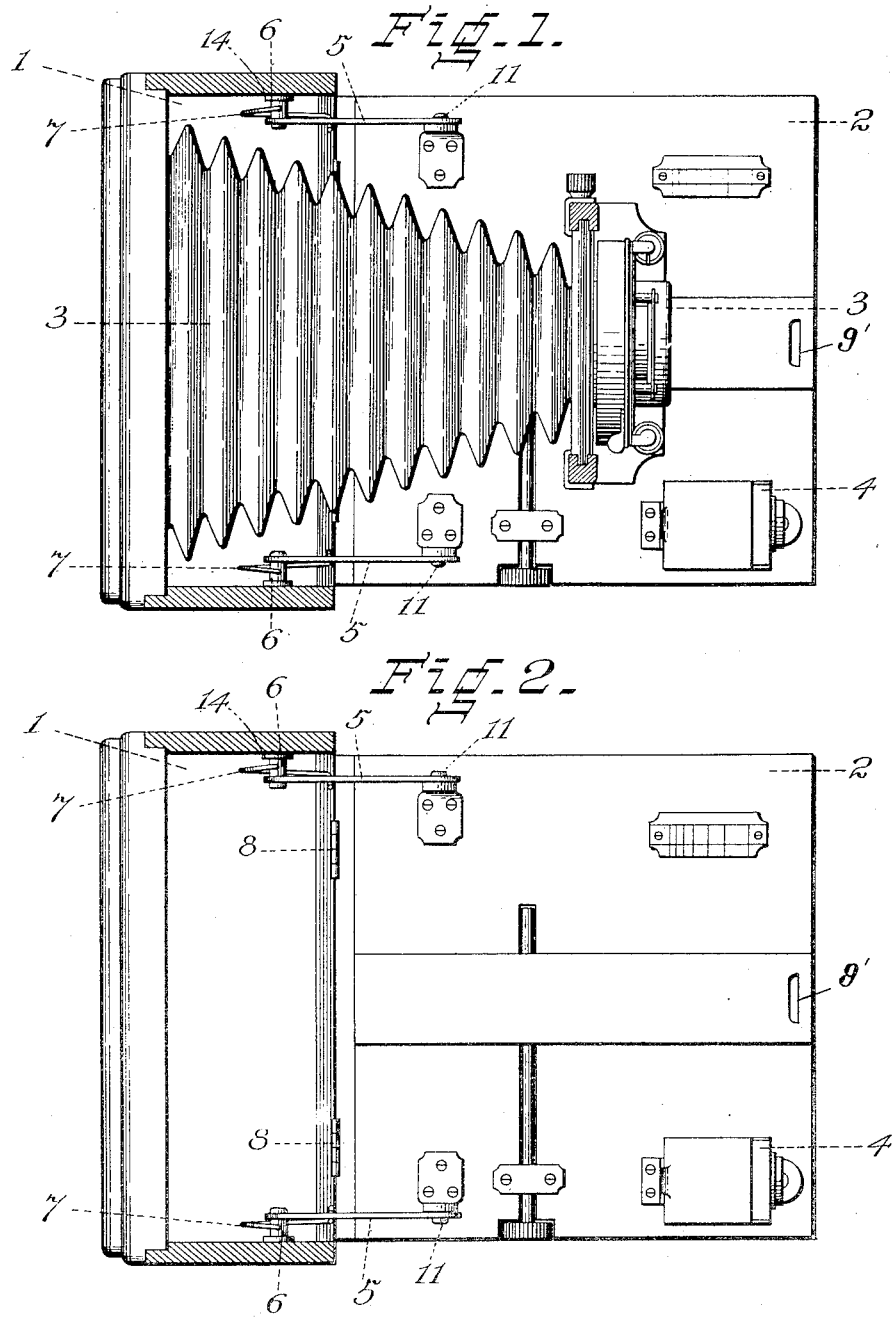

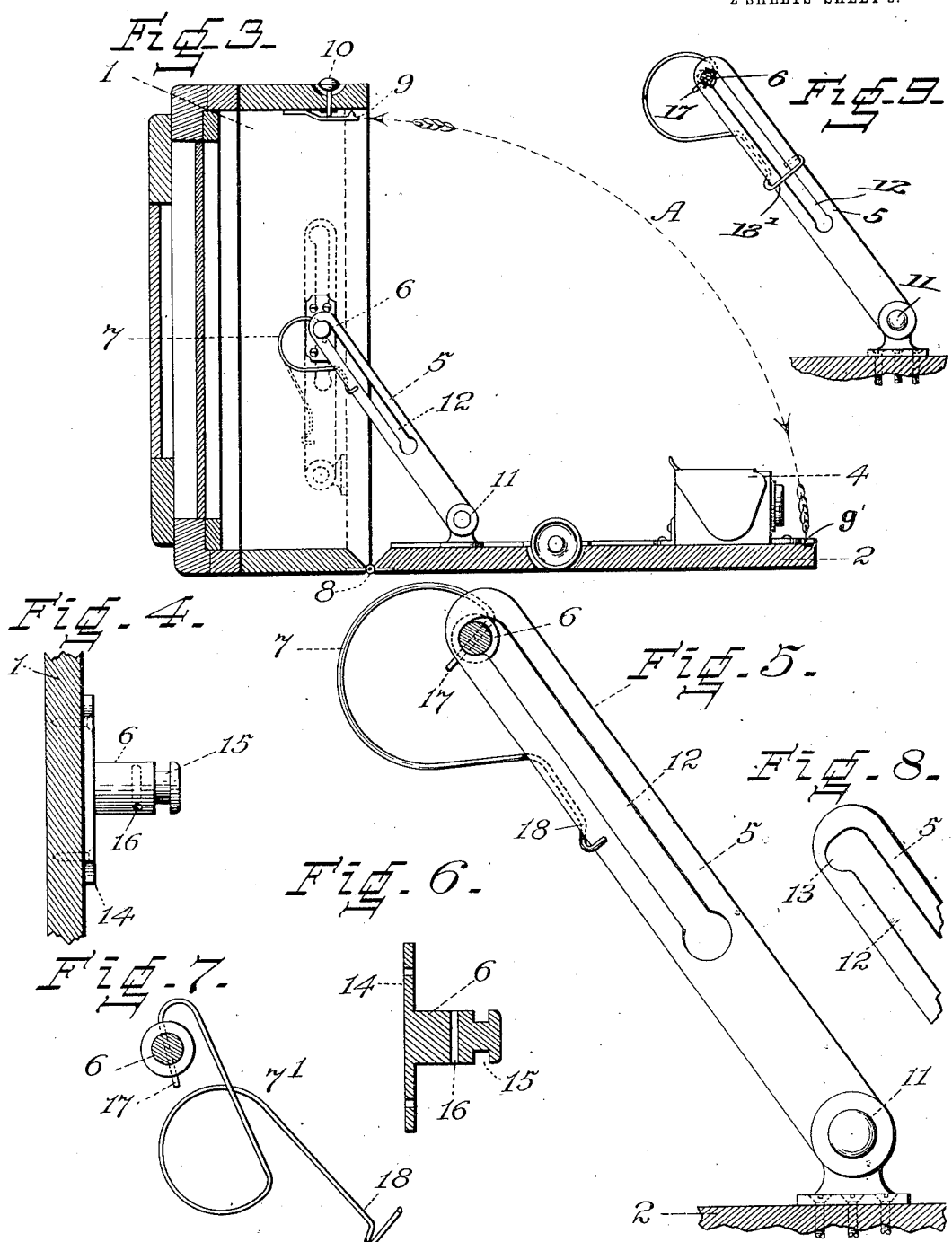

CHARLES JOSEPH SCHNEIDER, OF AUBURN, NEW YORK.

PHOTOGRAPHIC CAMERA.

1,053,067.  Specification of Letters Patent.  Patented Feb. 11, 1913.

Application filed March 6, 1911. Serial No. 612,462.

*To all whom it may concern:*

Be it known that I, CHARLES JOSEPH SCHNEIDER, a citizen of the United States, residing at the city of Auburn, in the county of Cayuga and State of New York, have invented certain new and useful Improvements in Photographic Cameras, of which the following is a specification.

My invention relates to that class of photographic cameras in which springs bearing against slotted side bars between the camera box and bed are utilized for throwing down the latter when it is released from a locked position against the camera box. As ordinarily constructed and placed such springs are secured in working position by screws passing into the wood-work of the camera box which, through use are liable to become loosened and consequently the springs disarranged from their normal contact position thus entailing readjustment and a retightening of the said screws or otherwise and consequent wear and mutilation of the wood-work.

The object of this improvement is to eliminate the use of said screws, and the annoyance caused by the loosening of the same in the wood-work of the camera box through the repeated action of the springs, and the requisite retightening and readjustment of the same, and this I accomplish by the mechanism shown in the accompanying drawings on two sheets in which:

Figure 1 is a plan view of a camera box partly in section with its top part removed, the camera bed thrown down, and the camera bellows partly drawn out to desired position on the camera bed. Fig. 2 is similar to Fig. 1, except the camera bellows has been removed. Fig. 3 is a part-sectional longitudinal elevation of Fig. 2. Fig. 4 is an enlarged elevation of one of the stud-pins fastened on the inner sides of the camera box. Fig. 5 is an enlarged elevation of one of the slotted side bars in working position on one of the stud pins with my improvement in relative operative place on the said stud pin. Fig. 6 is a section of a stud pin. Fig. 7 is a modified form of my improvement. Fig. 8 is a detail of the top or engaging end of one of the slotted side bars. Fig. 9, is another modification of my improvement.

Similar numerals of reference in the drawings, refer to similar parts.

Referring to: Figs. 1, 2, and 3,—1, represents the camera box; 2, the camera bed; 3, the camera bellows extension; 4, the view finder; 5, the slotted side bars; 6, the stud pins and 7, the novel spring comprising the main feature of my improvement.

The camera bed 2, is hinged to the bottom of the camera box 1, by hinges 8, and when it is closed against the camera box is there retained by the spring catch 9, engaging in the notch $9^1$, and it is provided with a press button 10. It also is connected with the said camera box 1, by slotted side bars 5, the bottom ends of which are pivoted to the said camera bed 2, by pivots 11. The slotted side bars 5, are furnished with longitudinal slots 12, the upper or box end of each of which is turned into a downward notch or rest 13, which is plainly shown in Fig. 8.

In a proper position on the inner sides of the camera box 1, are secured the stud pins 6, each of which has a foot plate 14, for the purpose. They are provided also with annular grooves 15, that reduces them sufficiently to allow them to pass in the slots 12, of the side bars 5, and also to engage in the stops or rests 13, already referred to. Each of the said stud pins 6, is further furnished with a hole or aperture 16, which is formed between the foot plate 14, and the annular groove 15, and completely passes through it as plainly shown in Fig. 6, and the purpose of which will presently be explained.

A spring 7, preferably of the form seen in Fig. 5, is provided with a straight shank 17, at one end, and near its other end it is upwardly turned and thence extended along one side of one of the slotted side bars 5, and then downwardly bent and again upwardly turned on the opposite side of the said slotted side bar 5, thus forming a longitudinal way or seat 18, in which the under side of the slotted side bar may freely ride during the opening and closing of the camera bed 2, as indicated by the dotted arc-arrow A, in Fig. 3. It will be evident that the way end 18, of the said spring 7, could be continued in a loop embracing the slotted side bar as shown in Fig. 9, but as such form would occupy space and could not so readily be adjusted in working position the form plainly shown in Fig. 5, is preferred. The shank 17, at the other end of the spring 7, passes through the hole 16, of the said stud pins and thus is firmly secured in a working position, the curve of the spring 7, pointing inwardly of the camera box 1, as seen in Fig. 3.

In Fig. 7, the spring is shown turned on itself at 7¹, instead of inwardly bent as seen in Fig. 5, but otherwise it is similar to the latter.

Another similar spring 7, is provided for the other side-bar.

When the camera bed is closed on the camera box,—or shut up,—the slotted side-bars bring the springs to tension and both assume the position seen in the dotted lines in Fig. 3, free from interference with other parts and as close to the inner sides of the camera box as is practical with their operation.

The details and arrangement of my improvement having thus been set forth, I will now describe its operation. Assuming the camera bed as closed or shut against the camera box and there held by the catch provided thereon, with the springs under their tension as has been mentioned; the operator desiring the bed thrown down so the camera bellows may be drawn out thereon, presses down on the push button 10. This action releases the catch 9, from the notch 9¹ and the stress of the springs 7, being exerted against the under sides of the slotted side bars, forces them outwardly and the connected camera bed which latter instantly assumes a position practically at right angles to the camera box as shown in Fig. 3, at which juncture the continued stress of the springs pushes the notches or rests 13, into engagement with the reduced portion of the stud pins, locking the camera bed in position for service as mentioned. Desiring to close the camera bed on the camera box, the operator exerting a downward pressure with his hands on the upper sides of the slotted side bars disengages the notches from the stud pins and the bed can then be closed to its first position as I have described.

I am aware that slotted side bars pivoted to the camera bed at one end and riding on stud-pins at the sides of the camera box are in use and known to the art and to such I make no claim broadly: but What I do claim and desire to secure by Letters Patent of the United States of America is—

1. In a photographic camera box having a spring catch on the top side; stud pins each having a foot plate, an aperture at one end between the groove of the foot plate, the stud pins being arranged opposite each other on the inner sides of the box; a front provided with a notch arranged to engage the spring catch and hinged to the bottom side of the box; side bars, each having a slot, adapted to engage in the groove of the respective stud pin, and provided at the inner end with a rest adapted to engage with the reduced portion of said stud pin formed by said groove, said side bars being pivoted at their outer ends on the one side of said hinged front; combined with similar spring members adapted to be held in the apertures of said stud pins at one end and opposite each other each having an extension terminating in a way or seat at the other end adapted to bear on the under edges of said side bars and push them outwardly and engage the said rests of said slots on the reduced portions of said stud-pins formed by said grooves when the hinged front is released from a closed position on the box through the disengagement of said spring catch of said box from the notch of said front substantially in the manner and for the purpose herein specified and shown.

2. In a photographic camera box having a spring catch on its top side; stud pins each having a foot plate, an aperture at one end between the groove of the foot plate, the stud pins being arranged opposite each other on the inner sides of the camera box; a front provided with a notch adapted to engage with said spring catch, and hinged to the bottom side of the box; side bars, each having a slot arranged for engagement with the groove of the respective stud pin, and provided at the inner end with a notch or rest adapted to engage on the reduced portion of said stud pin formed by said groove, and pivoted at its outer end on the inner side of said hinged front; combined with similar spring members adapted to be oppositely held in the apertures of said stud pins at one end, and being inwardly curved and each having an extension at the other end terminating in a way adapted to embrace and ride on the said side bars and push the same outwardly and engage said notches at the inner ends of said slots in said side bars with the reduced portions of said stud pins formed by said grooves when the said hinged front is released from a closed position against the box by the disengagement of said spring catch of said box from said notch of the hinged front adapting it for a bed substantially as herein described and shown.

In testimony whereof I have affixed my signature, in presence of two witnesses.

CHARLES JOSEPH SCHNEIDER.

Witnesses:
 FRANK R. RATHBUN,
 A. L. HEMMINGWAY.